(12) United States Patent
Sappenfield

(10) Patent No.: US 6,260,303 B1
(45) Date of Patent: Jul. 17, 2001

(54) CHRISTMAS TREE FEEDER

(76) Inventor: George Lewis Sappenfield, 21930 W. 191st St., Spring Hill, KS (US) 66083

( * ) Notice: Subject to any disclaimer, the term of this patent is extended or adjusted under 35 U.S.C. 154(b) by 0 days.

(21) Appl. No.: 09/016,284

(22) Filed: Jan. 30, 1998

(51) Int. Cl.[7] .............................. A47G 7/02; A47G 33/12
(52) U.S. Cl. ................................................ 47/40.5
(58) Field of Search ........................ 47/40.5, 79

(56) References Cited

U.S. PATENT DOCUMENTS

| | | | |
|---|---|---|---|
| 4,930,252 | * 6/1990 | Krause et al. | 47/40.5 |
| 5,009,028 | * 4/1991 | Lorenzana et al. | 47/40.5 |
| 5,076,009 | * 12/1991 | Gibor | 47/40.5 |
| 5,157,868 | * 10/1992 | Munoz | 47/40.5 |
| 5,299,381 | * 4/1994 | Oldenburg, Jr. | 47/40.5 |
| 5,369,910 | * 12/1994 | Copenhaver | 47/40.5 |

* cited by examiner

Primary Examiner—Michael J. Carone
Assistant Examiner—Joanne C. Downs
(74) Attorney, Agent, or Firm—WM Bruce Day

(57) ABSTRACT

A new and useful device for the watering, in a continuous basis, with great physical ease, of a Christmas tree.

3 Claims, 2 Drawing Sheets

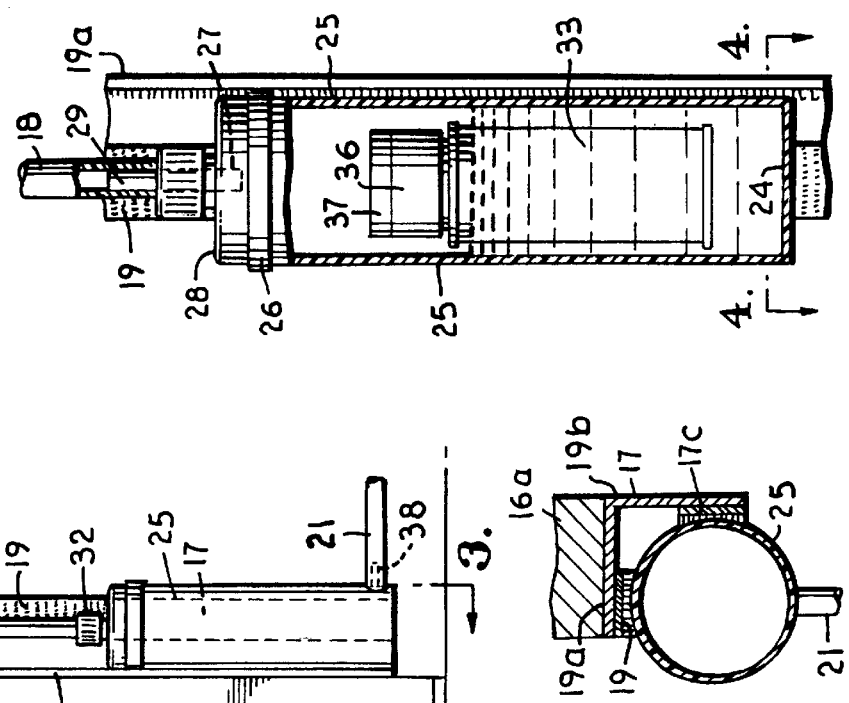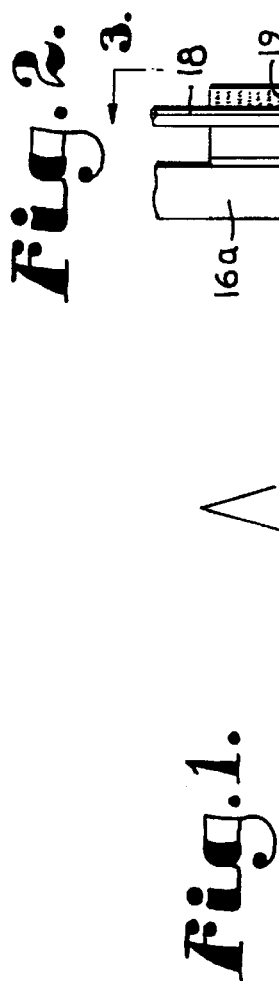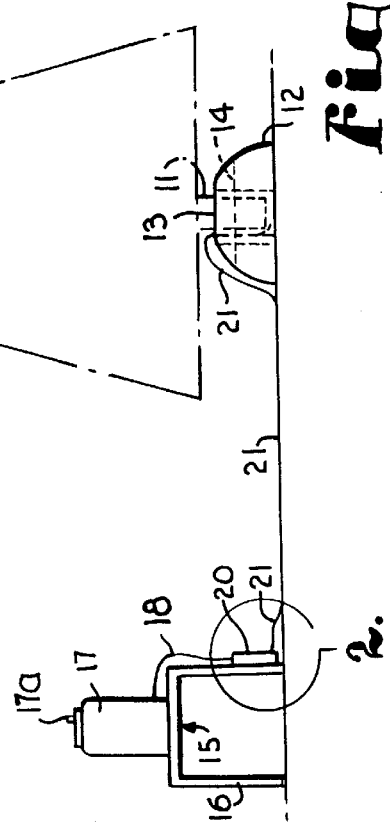

CHRISTMAS TREE FEEDER

BACKGROUND OF THE INVENTION

The background of the invention will be stated in several ways to cover the problems handled here.

Conventional tree stands normally only contain between two to four quarts of water. A dry tree may require approximately one and one-half quarts per day. Thus, the owner must fill the tree stand daily or at least every two days. Should the tree stand become dry, the tree will dry out, which results in needle drop, which is not only inconvenient, but poses a fire hazard. The principle object of the invention is to provide a new and useful automatic Christmas Tree stand waterer. This automatic waterer will supply water to a tree stand without the constant attention of the owner.

The problem of conveniently maintaining a water supply in the base of the stand for Christmas Trees has heretofore received attention in the prior art. The problem arises from the inconvenience of constantly filling and checking the water level in the base, given its location at the bottom and center of the tree. Given the rapid absorption of water by most trees in dry environment of a heated interior space, this inconvenience is significant.

This device is convenient to install and reliable in operation with a minimum possibility of flooding or accidental spillage and breakage.

Displaying Christmas Trees within the home is a long standing and enormously popular Christmas tradition. The Christmas Tree is displayed and held in an upright position by a stand and is usually surrounded by Christmas decorations and presents. The stand generally includes a watering basin within which the base of the tree is held by the particular holding mechanism of the stand. In order to preserve the tree in as fresh condition as possible and minimize fire hazards, the water basin should contain a supply of water which the tree may absorb through its base. Maintaining a supply of water within the watering basin can be difficult because access to the watering basin is usually blocked by the limbs of the Christmas Tree as well as the Christmas decorations and presents surrounding the tree. It is a benefit, therefor, to have an automatic watering system for maintaining the water level in the basin to insure the base of the tree remains submerged in water.

This invention relates to a controlling and controllable dispenser for water for a mounting means and the like whereby and not only water is automatically dispensed to the bark and cellular structure of the tree as the tree may need water in the environment, but also the tree is supported in an upright position in the stand portion of the dispenser in substantially any conventional way.

Considering the fact that Christmas trees are cut in cold weather at the end of November or the early part of December and thereafter marketed, the trees purchased by the consumers are in relatively fresh condition.

However, without water being provided for the tree, that is placed in a warm room, in sufficient quantity and varying quantity as the room temperature rises and drops during the day, the tree will dry out and the needles fall off of the tree in a relatively short period of time. With the quantity of Christmas tree lights and electrical devices that decorate a tree nowadays, the presence of the fire hazards created by a dried-out tree should be obvious.

Conventional tree stands normally only contain between two to four quarts of water at best. A dry tree may require approximately one and one-half quarts per day. Thus, the owner/user must fill the tree stand daily or at least every two days. Should the tree stand become dry the tree will dry out, which results in needle drop which is not only inconvenient put poses a fire hazard.

The problem of conveniently maintaining a water supply in the base of the stand for Christmas trees has heretofore received attention from the Prior Art. The problem particularly arises from the inconvenience of constantly filling and checking the water level in the base, given its location at the bottom and center of the tree. Given the rapid absorption of water by most trees in the dry environment of a heated interior living space, this inconvenience is significant.

This invention relates to float valves and mountings for the valves for controlling the level of fluid in a basin and more particularly concerns valves for controlling the level of fluids in basins such as Christmas tree stands, aquariums or hydroponics plant basins.

Displaying Christmas trees within the home is a long-standing and enormously popular Christmas tradition. The Christmas tree is displayed and held in an upright position by a stand and is usually surrounded by Christmas decorations and presents. The stand usually includes a watering basin within which the base of the tree is held by the holding mechanism of the stand. In order to preserve the tree in as fresh a condition as possible, the watering basin should contain a supply of water which the tree may absorb through its base. Maintaining a supply of water within the watering basin can be difficult because access to the watering basin is usually blocked by the lower limbs of the Christmas tree as well as the Christmas decorations and presents surrounding the tree. It would be a most significant benefit, therefor, to have a dependable, continuous watering system for maintaining the water level in the basin with the tree insuring the base of the tree remains submerged in water, while the original source of water itself is divorced cleanly and obviously from the basin.

FIG. 1 is a generalized plan view of a Christmas Tree Feeder embodying the present invention;

FIG. 2 is an enlarged fragmentary view taken from detail 2, FIG. 1;

FIG. 3 is a longitudinal sectional view taken along lines 3—3, FIG. 2;

FIG. 4 is a cross-sectional view taken along lines 4—4, FIG. 3;

SAPPENFIELD SYSTEM DESCRIPTION/REMARKS

THE PRIOR ART

Figure 5:
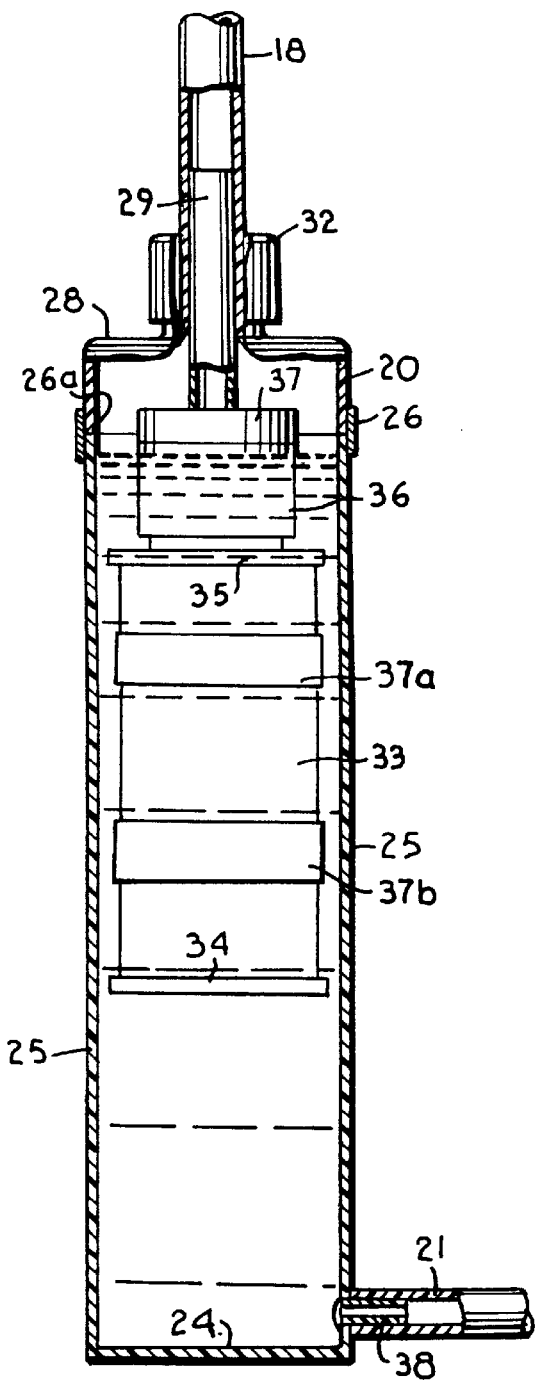
FIG. 5 is an enlarged longitudinal sectional view showing a high water level.
Figure 6:
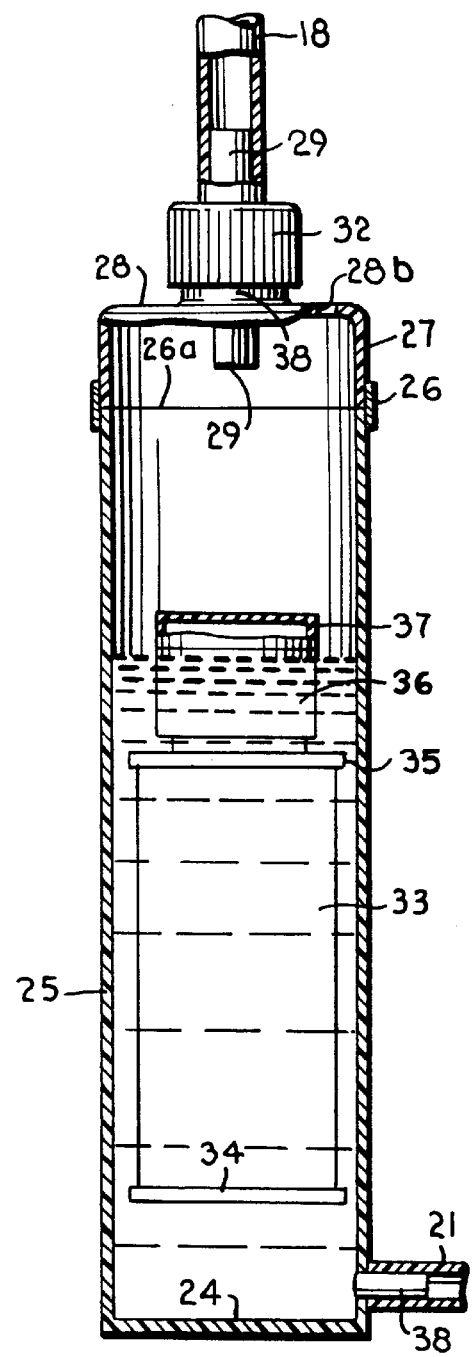
FIG. 6 is an enlarge longitudinal sectional view showing a low water level.

Applicant is aware of the existence of the following prior art, namely:

Jun. 23, 1964, Sokol, "Automatic Water Dispenser For Tree," U.S. Pat. No. 3,137,969;

Jun. 05, 1990, Krause et al, "Christmas Tree Waterer," U.S. Pat. No. 4,930,252;

Dec. 31, 1991, Cibor, "Christmas Tree Watering System," U.S. Pat. No. 5,076,009;

Feb. 25, 1992, Jacobsen, "Fluid Level Control Float Valve," U.S. Pat. No. 5,090,443;

Nov. 19, 1996, Couture, "Self-Watering Christmas Tree Stand," U.S. Pat. No. 5,575,110; and Jun. 04, 1996, Hollis, "Automatic Christmas Tree Stand Water Level Control System," U.S. Pat. No. 5,522,179.

Cibor, supra, is considered remotely related to my invention development.

OBJECTS OF THE INVENTION

An improved water supply system and flow supply system for Christmas tree stands 12 or holders, in which an elevated table-top water reservoir 17 is connected via flow tubing 18, 21 through a sealed float-valve assembly 20 is mounted near vertically along a leg of the reservoir-carrying spaced away support table or stand from the Christmas tree stand.

Another object of the invention is to provide a float element 33, 36 and 37 in said spaced away valve 20 for said water reservoir 17 supporting stand or table 15, that is slideably mounted within the valve housing and moves upwardly and downwardly with respect to a valve port penetrating the valve body whereby to maintain the water level in the tree stand.

Another object of the invention is to conveniently maintain a water supply 17 based on a spaced away table 15 or stand for water holding containers for Christmas trees, which vessel supplied is valve controlled by a valve 20, 25 which is not involved in any way with the Christmas tree or other vessel storage stand, per se.

Another object of the invention is to provide a device which effectively solves the problem arising from the user/owner's inconvenience of regularly necessarily measuring, checking and replenishing the water supply in the tree holding stand 12 itself, given the current location of the water feed level to the stand at its bottom and the lower center of the tree trunk 11.

Another object of the invention is to fully and easily solve the problem of replenishing the rapid absorption of water by most cut off trees mounted in the dry environment of a heated interior space housing, as well as the time between the cutting and mounting of the tree.

Another object of the invention is to provide a method of installing and mounting the water source or reservoir flow control valve 20, 25 completely clear of the tree stand and so that the absolute minimum of the tree sap and bark and other debris ever reach back up the supply flow line 21 to reach the control valve.

Another object of the invention is to provide a new automatic water level control system for use in conjunction with a Christmas Tree stand of the type having a watering basin 21, such typically with an outer rim 21 and a tree clamping mechanism 14 for holding a Christmas Tree trunk base and Christmas Tree in an upright manner with the base portion of the tree disposed within the watering basin 12.

Another object of the invention is to provide a new and novel self-watering tree stand having an external reservoir 17 for holding a supply of water and tubes 18 and 21 leading from the reservoir to the tree base holding compartment in the tree stand, there being a novel float valve 20, 25 for controlling the amount of water which is allowed to flow from the reservoir to the tree stand.

Another object of the invention is to provide a system for controlling the level of water in basins such as stands for cut Christmas Trees and other cut trees, aquariums or hydroponics plant basins.

Another object of the invention is to provide a novel apparatus for supplying water to a conventional Christmas Tree stand of possible varied structure where tubings 18 lead from an elevated reservoir to a lower valve 20, 25 and thence a further tubing 21 leads from the valve to the Christmas Tree stand. In this case, the valve 20, 25 is vertically adjustable with respect to the reservoir 17 and/or stand 15.

Another object of the invention is to provide a water dispensing system for a Christmas Tree stand that, upon the container of new water being filled with water and adjusted in position and height for action (and the trunk of the tree being inserted in the stand) will thereafter dispense water automatically and only upon the water requirements of the tree.

BRIEF SUMMARY OF THE INVENTION

The principal object of the invention is to provide an automatic Christmas tree waterer with a refillable quantity of reserve water. A further goal of the invention is to provide an automatic Christmas tree waterer which will supply water to a Christmas tree stand without the constant attention of the user except to supply water as needed, whence the precise level of the water reserve is constantly fully available to the review of the owner. Still another advantage of the invention is to provide a tree waterer including a monitor valve 20, 25 positioned on the water reserve reservoir stand, which will operate to activate when the water drops to a predetermined level within the tree stand whereby to supply water from the reservoir to the tree stand.

The system includes an elevated, table supported, relatively large volume support or reservoir 17 connected to a completely enclosed float valve 20, 25 disposed on the table support from the large volume reservoir. This valve 20 is secured to said reservoir table support 15 by suitable connections to one of the support/reservoir legs. The float valve 20, 25 comprises an elongated housing in which is vertically, slideably mounted, a float member 33, 36, 37 adapted to move against and away from a protruding port in the top of the housing into which water is introduced. The valving member is preferably a piece of lightweight foam plastic bearing a resilient seating material which provides an effective and reliable shutoff at low costs.

VALVE DETAILS

The subject device includes a fluid control valve 20, 25 that is typically compact, so that the valve may be utilized with tree basins of atypical shape:

(a) the fluid control valve 20, 25 is self-contained so that all moving parts thereof are within an external housing thereby protecting its essential parts from external damage;

(b) the fluid control valve having only a very few moving parts thereby reducing the likelihood of failure of the valve such as from damage to an essential element;

(c) the fluid control valve, wherein all parts thereof are easy and inexpensive to manufacture, also because of the valve has few components, all of which are made of commonly known materials; and (d) the fluid control valve 20, 25 in which the liquid level in the tree holder fluid reservoir may be easily adjusted by raising or lowering the valve structure 20, 25 itself without having to reposition any bulky floats or lever arms.

STRUCTURE AND FUNCTION

The subject disclosed reservoir, flow and valve control system can be used on any Christmas tree stand or related support that has a water reservoir built into it, or backed under it and requires frequent or continuous extra water supply.

The only thing in the subject device that is, inside the Christmas tree stand well, is the end part of a very small inner diameter hose. Therefore, essentially the maximum size outer diameter tree that the stand can hold can be used with this to be described system. It only takes about three-eighths of an inch inner diameter for the hose to be workably installed in the tree stand well. This system permits keeping the control valve well away from the tree stand and not submerged in the stand water that the tree is in. Likewise, this keeps all sap and trunk debris out of the control valve 20, 25. It also makes it easier to clean up at the end of a season. (Then one usually only has to clean the end of the hose that is in the tree stand.)

If, for some reason, either end of the hose 21 in the stand 12 or at outlet 38 should become clogged, it is simple to remove the hose 21 from the control valve and stand 12, then blow air through the hose, thus removing the clog. The valve hose end is reinstalled at the valve and filled with water. All of this can be done without having to go physically, in any way, near or under the tree.

Because the reservoir valve 20, 25 and reservoir 17 are mounted away from the tree, if something goes wrong with the device at any point, or if water is inadvertently poured into the reservoir that is so dirty that it clogs the valve, it may itself be cleaned without going under the tree or manipulating the tree stand 12.

Because Christmas tree stands include many different sizes, and different tree trunk grippers and well depths, the subject valve system is made to adjust to any actual water level present. The valve, per se, is mounted on a vertical L-angle bracket 19a, 19b preferably by Velcro® and can be moved up and down to adjust the water level in the tree stand 12 relative to that of the valve 20, 25 for many types of stands.

The valve float guide top and bottom rings 34 and 35 minimize vertical motion float friction, seen in FIG. 5.

OPERATION

The unit will operate properly even if the control valve is somewhat wrongly installed or knocked out of vertical as much as 36 degrees. The reason for this is the plastic foam seal 37 on top of the float upper part 36, which is, preferably, approximately three tenths of an inch thick. Because of the air pockets in the seal material 37, it will automatically conform to the lower inlet tube 29 end, even if the float body is at some angle from vertical.

Tree stands may be permanently retrofitted to use with the watering device by simply using a through the stand wall adapter (not seen). A small hole is drilled in an existing tree stand and a hose nipple is installed therein to receive the hose end 21. But the watering device may still be used with different stands by just using the hose in the stand as in FIG. 1.

Presetting the Water Level Before Installing Tree in Stand

Step 1, place the water reservoir table 15 that is going to be used near to the tree stand 12. If the stand 12 has a side hole nipple for filling, then place a ruler at the bottom of the tree stand side hole to make a first mark.

Step 2, measure a ruler or straight edge to the top of tree stand or nipple and locate the same location on the reservoir table 15, leg 16. Make marks, noting location.

Step 3, tape the angle bracket 19a, 19b to table leg so that it sticks up past the mark on the table leg by, at least, two inches. If a short stand is being used, then let the angle bracket 19a, 19b run as high as it wants to by taping the bracket bottom even with the bottom of the table leg.

Step 4, install control valve cylinder 20, 25 on bracket 19a, 19b by engaging Velcro® to Velcro® strip on each with top of valve even with the pencil mark on table leg. This will make a water level to start about three inches below top of tree stand top.

Step 5, install both tree holder 12 and reservoir stand 15 and then place water hoses 18 and 21 in stand as shown. Tape hose 21 to stand or stand leg.

Step 6, fill reservoir 17 with water.

Step 7, lift the table 15 with reservoir 17 up about six or eight inches off the floor. This will start the unit working. Hold for about five or six seconds.

Step 8, after the valve unit and tree stand have filled end to end, you can adjust the water level in the stand 12 by raising or lowering the float unit 20,25. If you move the float unit up one-half inch, water level in the stand will raise one-half inch. If you move the unit 15 down one-half inch, water level 12 will readjust down one half inch. Continue on down and adjustments will take a period of time to establish a new water level, because the tree and evaporation must use the extra water up first. It is easy to see that getting the right water level for almost any tree stand is convenient to the owner.

The subject watering system uses two different stages of water feeds to operate:

1. The first is a gravity flow reservoir 17 is above float, 20, 25 and water simply flows 18 to the valve.
2. The second step is a siphon-hose system 21 as seen in the drawings. (As long as the tree hose end 21 is below the level of the bottom of the valve, even with a hump in the middle, as where it enters stand 12, that is lower than the valve 20, 25 level, a water will still flow because of the principles of air pressure in a siphon system.)

Air pressure pushes down on the water in the valve 20, 25. When you lift the table and the valve above the tree stand hump where the hose enters, the siphon will start. Once started, the siphon will continue to operate as long as the reservoir fills the valve system. The water in the stand 12 will rise to equal out with the water level in the float container 20, 25. When both become equal, the float will rise to topmost level and the seal will shut off the water flow to the stand. When water is lower in the stand 12 and the float container 33, 36, 37 level goes down, the 29–37 seal will open and the siphon process will be repeated as water is needed by the tree.

VARIATION

If a tree that is purchased is so large re stand opening 13 that even the small diameter hose in the system won't fit into the tree stand well, the tree can be cut so the water system can still be used. Simply cut a notch up the trunk that sticks up above the stand. About one half inch wide and one half inch deep. Then take a small piece of cloth and use it as a notch liner. This is for what is known as a wicking effect. The reason is to keep the tree watered even in the notched area. Don't let the wick material (notch liner) stick over the side of the stand or water will drip.

The float seal 37 is easily replaced when damaged or worn out. Simply remove float 33 from float housing 25, unscrew the float seal cap 37, screw on a new float seal cap 37 with seal and replace in the float container.

DESCRIPTION OF THE DRAWING FIGURES

FIG. 1 shows a Christmas Tree or like growth as the top 10 and is shown conical typically in the growth of the tree or cutting thereof. Number 11 indicates the trunk of the tree extending down below the foliage or needles of the tree into stand 12.

At 12 is shown schematically a typical Christmas tree stand which must involve the means 13 to receive and hold the lower trunk 11 of a Christmas tree or other like growth. 13 shows the opening to receive the trunk of the tree and the water that sustains water in the tree trunk and keeps the needles on the tree from falling off and creating a fire hazard. 14 schematically indicates devices which engage the outside of the tree trunk, usually from four sides, to rigidly hold it in recess 13 of the tree supporting device.

Separate from the tree and spaced as far therefrom as desired by the user (which spacing will be taken up by the watering process tube 21, which will be described), longer hose 21 reaches between the tree base holder 12 and the valve of the water source described.

At 15 is, typically, a table-like or stool-like construction 15 of plastic or wood or even aluminum, but the material must be strong enough to steadily carry the weight of the container of water, reservoir 17 thereof, which will be described. Upper horizontal surface 15 is carried by legs 16.

The invention of this Application lies in the manner of supply and transport as well as control of water from reservoir 17 through short pipe or tube 18 and valve 20, 25 into long tubing 21. Looking at FIGS. 2 and 3, leg 16a of the reservoir holder carries a doubly internally Velcroed® angle iron 19a, 19b as an L-shaped member which is taped, glued or otherwise rigidly attached to leg 16a. It must be noted that the attachment to leg 16a is not fixed until the water balance is fixed (described below) between the tree container 12 and valve 20, 25. Preferably, in fact, the L-shaped member 19a, 19b is Velcro®-attached to leg 16a so that, from time to time, the height of the valve 20, 25 on the leg may be adjusted.

The outer edge of the L-shaped member 19a is seen in the lower portion of FIG. 2 and the discharge tube from the valve is seen at 18.

FIG. 4 is a horizontal section through valve 20, 25, leg 16a and the connection between the leg 16a and angle 19a, 19b by Velcro at 19. The valve body 20, 25 with its lower discharge tube 38 covered by one end of line 21 is also seen.

The feed tube 18 from the reservoir 17 is received at the valve top in a waterproof collar 32. There is also provided a lesser internal diameter extension tube 29 in tubing end 18 the valve body top 32 and such with some reservoir extension into the valve, a member 29 of hard plastic or glass.

The valve body which is detailed in what has been previously described and shown is best seen in FIGS. 2, 3, 5 and 6 built on housing 25.

The valve body itself is provided with a bottom wall 24 and preferably cylindrical side wall 25 up to band 26. Band 26 may be adhesive or Velcro® or the like in order that the valve body where cut at 26a may be opened periodically at a peripheral line cut 26a to give access to the piston member to be described which moves upwardly and downwardly therewithin. Upwards on the valve housing 25 is a short section 20 which contains the line 26a severing the valve body for access to this inside thereof and top wall 28 which is, as may be seen by FIGS. 3, 5 and 6, a structural member. Centering wraps 36 and 37 are provided. In FIG. 5 one sees the valve portions already described together with the severance 26a covered by the removable seal 26. There is above valve body 25 in the central top opening 38 provided an extension of an elongate glass or plastic strong tubing member 29, which is received in the tubing 18 lower end and extends into the top portion of the control valve 25. Member 29 is fixed in and does not move with respect to tubing 18. A brace or solidifier cap 32 is provided on the top portion of the valve to 28 and is threadably attached thereto.

Looking at the piston 33, 36, 37 in the valve control body 25, this moves upwardly and downwardly according to the circumstances described in this application (quantity of water in the valve), there is first seen body 33 of substantial lesser diameter than the interior diameter of the valve. Next may be seen the upper and lower slightly enlarged, centering rings 34 and 35. Elements 33 and 36 are hollow and sealed. There is provided block portion 36 above piston 33 to which, on the upper side thereof, there is provided a resilient pad 37 of suitable porous plastic or rubber. Finally, at the bottom of the valve there is provided a strong outlet spout 38 to which may be attached one end of tubing 21 (see FIGS. 2 and 5).

With respect to the actual assembly and use of the device, the following additional remarks may be made. The materials included in the kit will include the reservoir for water 17, angle bracket 19a, 19b, three or more Velcro® strips, the valve float bottle 25, with an eight or longer foot hose 21 and a two foot or longer hose 18.

Required from the user are the tree stand 12 (minimum 3 and ¼ inch deep bowl), a small table or stand 15 which is 16 inches to 18 inches high to carry the water reservoir 17, a ruler or straight edge, tape or string, pencil or marker and scissors.

In assembly, take the angle bracket 19a, 19b and two eight inch Velcro® strips that are to mount the bottle 25. Peel the backing off of these Velcro® strips and place these Velcro® strips on inward opposing faces of the length of the angle bracket 19a, 19b as seen in FIGS. 2, 3 and 4. Take a third Velcro® strip out, fold it into thirds and cut the third strip at the folds. Place the strips 36 and 37 on the float bottle 25 (FIG. 5) circumferentially at equal distances, top, center and near bottom. These Velcro® strips are not seen in the Figures.

Measure the depth of the water bowl on the user's tree stand that is being used, as seen at 12, 13, 21 in FIG. 1. If the bowl depth is 4 and ¾ inches or more, place the tree stand and small table on a countertop (level flat surface). Lay a straight edge or ruler on top of the tree stand 12 and table 15 top set on a flat surface so that it crosses one of the table legs 16. Mark that table leg with a first pencil mark on the bottom side of the straight edge. Tape angle bracket 19a, 19b to the table leg 16 so that it sticks up two inches past the pencil mark on the latter. Place float bottle 25 into angle bracket 19b so that the top 28 of float 25 is even with the pencil mark.

Next locate the tree stand 12 and small table 15 carrying the reservoir in their final locations in the house room. The small table should be in a place easily accessible once the tree is up. Set the reservoir 17 on the small table 15 with the small length hose 18. Attach the free end of the small length hose 18 to the float bottle 25 top. One can now run the greater length hose 21 from the bottom of the float bottle 25 at connection 38. Make sure the greater length hose 21 extends all the way to the bottom of stand 12, and is taped to the outside surface of stand 12. Take care to make sure the hose 21 will be out of the way of person movement in the room.

To start, fill the reservoir with water. Lift the reservoir 17 and small table 15 in the air about eight inches and hold them there for approximately ten seconds. Fill the reservoir 13 of the tree stand 12 as needed, taking care not to get or let the water level get far above or below the small length hose end 21. One may raise the water level in the stand 12 by moving float bottle 25 upwardly. Take care not to move float bottle 25 more than one-half inches up at a time and be careful not to overflow water from the tree stand well 13 by moving the float bottle too high.

On the other hand, if the depth of the water bowl is under 4 and ¾ inches, tape the angle bracket 19a, 19b bottom even with the bottom of one of the table legs 16.

Place the tree stand 12, tube 21 and the small table 15 on a flat surface countertop. Lay a straight edge on top of the tree stand 12 so that it crosses the table leg 16 with the angle bracket 19a, 19b attached. Mark the leg that is crossed by the straight edge with a second pencil mark on the bottom side of the straight edge. Measure the depth of the stand 12 water bowl 13.

Using a first higher pencil mark to measure from, make a second pencil mark on the angle bracket 19a, 19b the depth of the water bowl 13 down from the first mark. Now place the float bottle 25 on the angle bracket with the bottom of the float bottle even with the lower second pencil mark. From thence, the location and start up directions are the same as given.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A plant watering device comprising:
    a) a plant container having a container wall, the container forming a water basin in contact with a plant requiring water;
    b) a water reservoir spaced from said plant container and elevated thereabove;
    c) a water control valve containing an internal valve mechanism, the control valve connected at one end by a first flexible hose to said water reservoir and connected at a second end by a second flexible hose extending to said plant container and spacing said control valve remotely therefrom;
    d) said internal valve mechanism calibratable with a water level in said plant container so as to replenish the water level therein from said water reservoir and control valve remote therefrom.

2. The plant watering device set forth in claim 1 wherein said water control valve includes an upright, tubular member with said first flexible hose extending into said member at a top end thereof and said second flexible hose extending into said member from a bottom end thereof; a floating piston in said tubular member having a resilient top pad engageable with an outlet of said first flexible hose to shut off flow therefrom when said tubular member is full of water, the water gradually draining from said tubular member through said second flexible hose to replenish water in said plant container.

3. A plant watering device comprising:
    a) a plant container having a container wall, the container forming a water basin in contact with a plant requiring water;
    b) a water reservoir spaced from said plant container and elevated thereabove;
    c) a water control valve having an upright, tubular member connected at a top end by a first flexible hose to said water reservoir and connected at a bottom end by a second flexible hose extending to said plant container and spacing said control valve remotely therefrom;
    d) said tubular member having a floating piston therein movable between an upper, shut-off position and a lower, water-admitting position to maintain said tubular member full of water with said water siphoning therefrom to replenish said plant container.

* * * * *